United States Patent
Sugitani

(10) Patent No.: US 7,954,594 B2
(45) Date of Patent: Jun. 7, 2011

(54) VEHICLE STEERING APPARATUS

(75) Inventor: Nobuo Sugitani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 12/584,104

(22) Filed: Aug. 31, 2009

(65) Prior Publication Data

US 2010/0051377 A1     Mar. 4, 2010

(30) Foreign Application Priority Data

Sep. 2, 2008    (JP) .................... 2008-224810

(51) Int. Cl.
     *B62D 5/04*      (2006.01)

(52) U.S. Cl. ...................................... 180/446; 180/444
(58) Field of Classification Search .................. 180/443, 180/444, 446
See application file for complete search history.

(56) References Cited

FOREIGN PATENT DOCUMENTS

JP     2007-055605     3/2007

*Primary Examiner* — Tony H. Winner
(74) *Attorney, Agent, or Firm* — Carrier Blackman & Associates, P.C.; Joseph P. Carrier; William D. Blackman

(57) ABSTRACT

A vehicle steering apparatus, which includes: a steering system connection member connecting a steering wheel and a tire; an electric generator installed in the steering system connection member so as to adjusting a steering force of the steering wheel; and a control unit for controlling a connection/disconnection of both terminals of an armature coil in the electric generator based on a vehicle speed.

8 Claims, 3 Drawing Sheets

VEHICLE STEERING APPARATUS

CROSS REFERENCE TO RELATED APPLICATIONS

This application claims the foreign priority benefit under Title 35, United States Code, §119(a)-(d) of Japanese Patent Application No. 2008-224810, filed on Sep. 2, 2008, the contents of which are hereby incorporated by reference.

BACKGROUND OF THE INVENTION

1. Field of the Invention

The present invention relates to a vehicle steering apparatus for conducting a damper control of a steering force of a steering system.

2. Description of Related Art

As an assisting device in a steering force of a steering system, an electric power steering apparatus has been widely known. For example, in the electric power steering apparatus where the steering force is assisted by a brushless motor, a technology has been disclosed (for example, see JP 2007-55605) where a steering feeling is improved by conducting a damper control of the steering force of the steering system based on a phase (electric motor phase) of the brushless motor. In addition, a conventional suspension unit for front wheel (turning side wheel) is setup a suspension geometry which indicates a positional relationship for determining an alignment change, based on a comprehensive point of view for, for example, a straight running stability of a running vehicle, an easiness for turning wheel at low speed, a kickback toughness in order not be stuck by disturbances in running, and a returning manner of steering wheel under free condition (steering wheel returnability). In this case, in the conventional suspension unit, a kingpin offset which indicates a distance between a position, where the center line of a kingpin intersects with a road surface, and a position, where the tire contacts with the road surface, is set as small as possible to reduce a steering force (axial tension) at low speed for achieving an easy operation of the steering wheel.

In the conventional electric power steering apparatus described above, for example, a convergence of the steering wheel returnability is improved by a damper control function. However, this gives a viscosity component for control which mainly depends on a steering angle speed (rotation speed of motor), and most of the effects do not directly operate on a poorness of steering rigidity and a poorness of straight running stability due to decrease in self aligning torque (hereinafter, referred to as SAT) for maintaining the straight running stability of the vehicle.

In addition, the conventional suspension unit has a limitation for reducing a steering force (axial tension) at extremely low speed even if a setting of the suspension geometry is optimized. Therefore, the inventor of the present invention, et al. have developed a method for reducing an axial tension at low speed by, for example, increasing a kingpin offset, thereby increasing a traveling distance of a tire contact point and revolving the tire around a kingpin axis (see JP 2008-214815, not laid-open yet).

However, there is a possibility that a vehicle wobbles in running, and that a straight running stability of the vehicle decreases due to a poorness of steering reaction force by decrease in SAT. In addition, there is a possibility that a vehicle is stuck in wheel ruts, and that a disturbance toughness of the vehicle decreases due to increase in rotation moment by the revolution of the tire.

The present invention has been developed in consideration of the above issues. It is, therefore, an object of the present invention to provide a vehicle steering apparatus which provides a comfortable steering feeling.

SUMMARY OF THE INVENTION

According to a first aspect of the present invention to solve the above issues, there is provided a vehicle steering apparatus which includes: a steering system connection member connecting a steering wheel and a tire; an electric generator installed in the steering system connection member so as to adjusting a steering force of the steering wheel; and a control unit for controlling a connection/disconnection of both terminals of an armature coil in the electric generator based on a vehicle speed.

In the configuration described above, a power line of a steering motor disposed in the conventional electric power steering apparatus is removed, and a steering damper apparatus is used, where the steering motor is used as an electric generator. Namely, when a vehicle is running at high speed, both terminals of an armature coil of the steering motor are connected and the steering motor is used as an electric generator so that a braking force to be generated by regenerative electric power is applied to the steering system connection member. Therefore, the braking force is applied to a steering force of the steering wheel as a damper at high speed, and thereby, a steering feeling is stabilized at high speed. On the other hand, at low speed, since the both terminals of the armature coil of the steering motor are disconnected (opened), the steering motor is not used as the electric generator, and thereby a braking force is not applied to the steering system connection member. Therefore, a steering force (axial tension) is maintained at low, and thereby, a steering feeling is maintained comfortable.

According to a second aspect of the present invention, there is provided a vehicle steering apparatus of the first aspect, wherein when a steering angle is at around a neutral position, the both terminals of the armature coil are connected.

In the configuration described above, when a steering angle is at around a neutral position, the both terminals of the armature coil are connected to generate regenerative electric power by the electric generator. Therefore, when a vehicle is running straight, a wobble of a steering angle of the steering wheel is suppressed by the braking force due to generation of regenerative electric power of the electric generator, and thereby, a straight running stability can be maintained.

According to a third aspect of the present invention, there is provided a vehicle steering apparatus of the first aspect or the second aspect, wherein an intersection point of an extended line of a kingpin axis of the tire with a tire contact surface is located inside a tread surface of the tire.

In the configuration described above, since a kingpin offset can be set large, a rolling of a front wheel can be utilized when a turning operation is conducted at low speed, for example, in a stationary steering of a turning wheel. Therefore, a force required for turning wheel can be largely reduced. In addition, since a lift-up amount of a vehicle body at one side is extremely small when a turning operation is conducted, a force required for the turning wheel can also be reduced.

According to a fourth aspect of the present invention, there is provided a vehicle steering apparatus of the first aspect or the second aspect or the third aspect, wherein the both terminals of the armature coil in the electric generator are connected through a battery.

In the configuration described above, since electric power to be generated by the electric generator is stored in the battery, the energy is effectively utilized, thereby resulting in low power consumption.

According to the present invention, since a damper control is conducted for the steering system depending on a vehicle speed, a comfortable steering feeling can be obtained.

DETAILED DESCRIPTION OF THE PREFERRED EMBODIMENT

Summary of the Embodiment

A steering load of front wheel can be largely reduced (that is, axial tension can be largely reduced) in comparison with that of the conventional steering device by increasing an offset of a kingpin axis as large as possible in a suspension unit for turning wheel and revolving a tire around the kingpin axis. However, since a rotating operation of a steering wheel 2 becomes easy (light) due to large reduction of the axial tension, there is a possibility that a running stability and a steering rigidity of the vehicle may be decreased.

Therefore, in a vehicle steering apparatus according to the embodiment, a steering damper apparatus and the suspension unit for the turning wheel which are configured by a technology concept different from that of the existing electric power steering apparatus are used. In the steering damper apparatus, a steering motor of the electric power steering apparatus is operated as an electric generator to conduct a damper control of electric steering damper mechanism.

More specifically, a control to connect/disconnect both terminals of an armature coil of the steering motor depending on a vehicle speed is conducted, and when the both terminals of the armature coil are connected, a damper control is conducted by operating the steering motor in the electric power steering apparatus as an electric generator.

Using the technology described above, an optimum steering feeling of the steering wheel 2 can be obtained in a wide range from low speed to high speed.

Embodiment

Hereinafter, a preferred embodiment of a vehicle steering apparatus according to the present invention will be explained by referring to drawings. The vehicle steering apparatus according to the present invention is provided with a suspension unit for turning wheel where an offset of a kingpin axis is set as large as possible and a steering damper apparatus with an electric generator, and realized based on a technology concept different from that of the conventional vehicle steering apparatus. Therefore, each component will be explained first individually.

<Suspension Unit for Turning Wheel>

Figure 1:
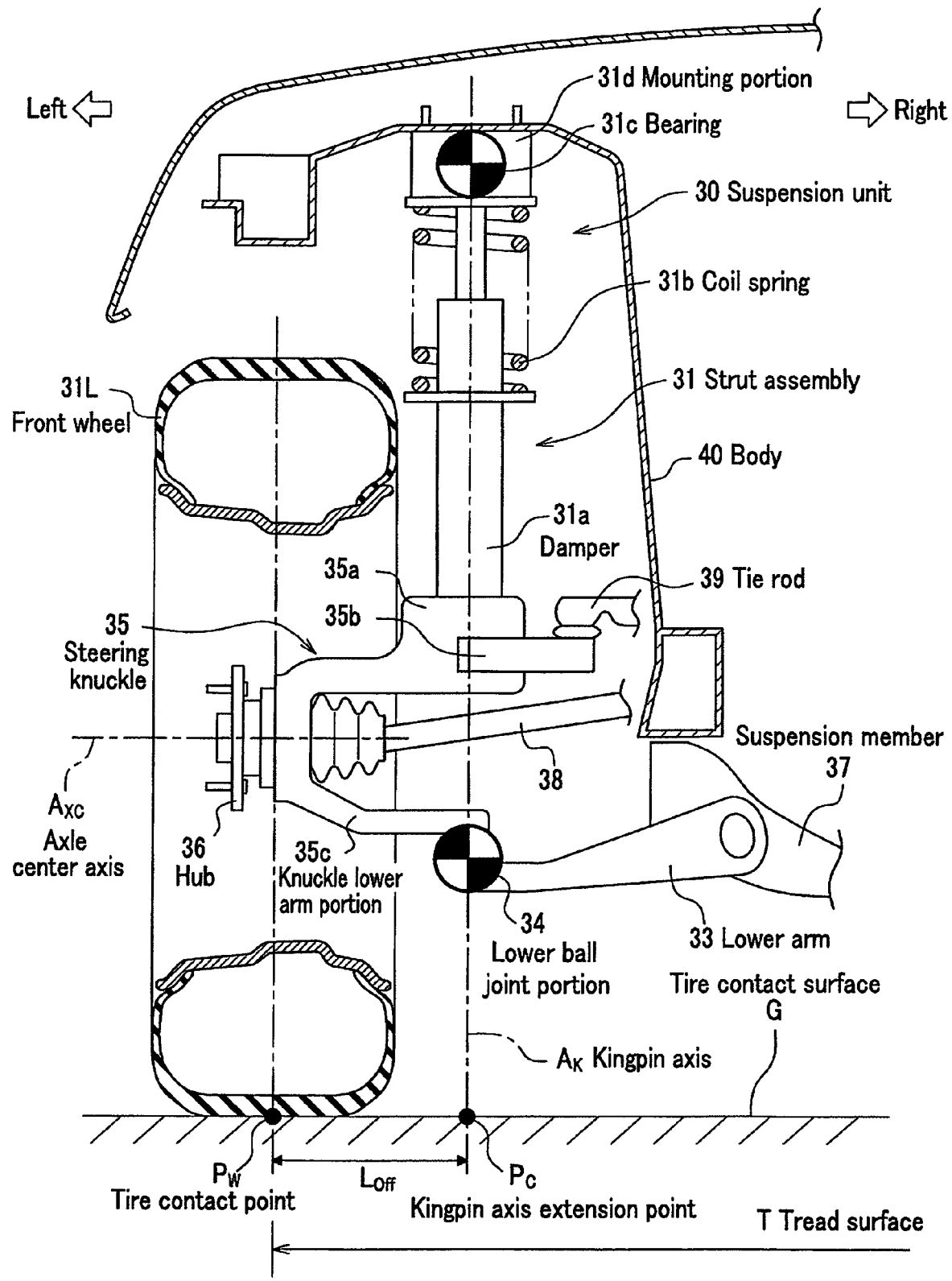
FIG. 1 is a schematic illustration of a suspension unit for turning wheel, which is applied to a vehicle steering apparatus according to an embodiment of the present invention.

FIG. 1 is a schematic illustration of a suspension unit for turning wheel, which is applied to a vehicle steering apparatus according to an embodiment of the present invention. That is, the illustration is a schematic illustration of a strut type suspension unit for the left front wheel as seen from the rear side of a vehicle. It is noted that in the explanation below, a suspension unit 30 for a front wheel 31L (turning wheel) on the left side will be explained as an example. On the other hand, a suspension unit for a front wheel (turning wheel) on the right side is configured symmetrically with respect to the suspension unit 30 for the front wheel 31L (turning wheel) at the left side.

The strut type suspension unit 30 consists of a strut assembly 31 which supports a vehicle body through the front wheel 31L and a lower arm 33. In addition, an axle assembly arranged in the vicinity of a rotation axis of the front wheel 31L and a damper holding portion 35a, which is an upper side portion of a steering knuckle 35, for holding a hub 36 are connected and fixed to a lower end of the damper 31a of the strut assembly 31.

A knuckle lower arm portion 35c, which is a lower side portion of the steering knuckle 35, is different from the conventional one, and as shown in FIG. 1, extends inside the front wheel 31L in the vehicle width direction. An end portion of the knuckle lower arm portion 35c composes a lower ball joint portion 34 together with a front end portion of the lower arm 33 having a A-shaped end portion, and is connected rotatably around a kingpin axis Ak extending in the vertical direction. It is noted that the kingpin axis Ak is a virtual axis connecting the center of a bearing 31c and the center of the lower ball joint portion 34, which is a center axis of turning of the front wheel 31L.

An end portion of the lower arm 33 at the vehicle body side is connected to a suspension member 37 rotatably in the vertical direction using a bush. The suspension member 37 is fixed to a body 40.

Meanwhile, a drive shaft 38 of the front wheel 31L drives the front wheel 31L around an axle center axis Axc as a rotational axis through the axle assembly and the hub 36.

The strut assembly 31 consists of the damper 31a for attenuating mainly an impact and vibrations, a coil spring 31b for decreasing a vehicle height fluctuation and for securing a driving stability and the like, and a mounting portion 31d for fixing. The mounting portion 31d is bolted to the body 40.

In addition, the bearing 31c which rotatably connects the strut assembly 31 to the body 40 so that the strut assembly 31 can rotate around a vertical axis is incorporated in the mounting portion 31d. The damper 31a and coil spring 31b of the strut assembly 31 can rotate around the kingpin axis Ak (see FIG. 1), which connects the center of the bearing 31c and the center of the lower ball joint portion 34, together with the steering knuckle 35.

Here, the kingpin axis Ak is set substantially in the vertical direction, and a kingpin angle is set to zero as well as a caster angle is also set to substantially zero. As a result, a strut axis substantially coincides with the kingpin axis Ak, and a load input axis of the damper 31a also substantially coincides with the strut axis.

As shown in FIG. 1, the kingpin axis Ak is located inside the front wheel 31L in the vehicle width direction and extends substantially in the vertical direction. A kingpin offset (hereinafter, referred to as Kp offset) Loff, which is a difference (distance) between a kingpin axis extension point Pc that is an intersection point of an extended line of the kingpin axis Ak with the road surface (tire contact surface G) and a tire contact point Pw, becomes, for example, several tens of centimeters (cm) in comparison with the conventional offset (distance), which was not more than a few cm. In this case, a trail becomes substantially zero.

It is noted that the steering knuckle arm 35b, for example, extends short inside the vehicle in the rear direction from a neighbor of the kingpin axis Ak of the damper holding portion 35a, and an end of tie rod 39 is connected to the end of the steering knuckle arm 35b with screws.

When the steering wheel 2 is operated (see arrow α2 in FIG. 2) at the driver's seat, a pinion shaft 4 rotates to move a rack shaft 8 inside a steering gear box in the right-left direction (direction of arrow α1 in FIG. 2) if the steering mechanism is, for example, a rack-and-pinion type, and the tie rod 39 shown in FIG. 1 simultaneously rotates the steering knuckle 35, damper 31a, and the coil spring 31b around the kingpin axis Ak (front wheel 31L revolves around kingpin axis Ak) through the steering knuckle arm 35b to turn the front wheel 31L.

Namely, when the front wheel 31L is turned, the front wheel 31L is rotated (is revolved) around the kingpin axis Ak which extends substantially vertically. Since the Kp offset Loff is large such as several tens of centimeters, the front wheel 31L turns around the axle center axis Axc by rolling (rotating) on the road surface. As a result, a resistance for turning the front wheel 31L can be suppressed to be extremely small without causing a large resistance that is caused when the tire is twisted around the tire contact point Pw in the conventional stationary steering.

In addition, since the kingpin angle and the caster angle are set to substantially zero in the configuration in FIG. 1, a lift-up amount of the vehicle body at one side is extremely small. As a result, a force required for the turning also becomes small. It is noted that even if the caster angle is small, that is, substantially zero, since a pneumatic trail such as 1 to 4 cm is caused when the vehicle is running, a self-aligning torque for the straight running stability is secured partially.

In addition, in the strut assembly 31 of the suspension unit 30, since the strut axis substantially coincides with the load input axis, an arm length for generating a bending moment becomes substantially zero, thereby the strut assembly 31 is almost free from the bending moment. As a result, a prying on sliding of the damper 31a is suppressed, that is, a force to be applied to a direction intersecting with a sliding direction of the damper 31a is suppressed, thereby the damper 31a smoothly operates with less friction, and a feeling of the vehicle is improved in comparison with the conventional suspension unit, accordingly.

Furthermore, since the bending moment to be applied to the strut assembly 31 is small, a load applied to the mounting portion 31d becomes smaller than that of the mounting portion of the strut assembly in the conventional suspension unit.

According to the configuration in FIG. 1, the caster angle is substantially zero, as well as the kingpin angle is zero. The kingpin axis Ak is set substantially vertically and the Kp offset Loff is extremely large in comparison with the conventional one. As a result, (1) A force required for the turning can be largely reduced by utilizing rolling of a front wheel when a turning operation is conducted at low speed, for example, in a stationary steering of a turning wheel. (2) Since a lift-up amount of a vehicle body at one side is extremely small when a turning operation is conducted, a force required for the turning can also be reduced, accordingly.

Namely, if the steering mechanism is a rack-and-pinion type, an axial tension to be applied to the pinion shaft 4 which drives the rack shaft 8 connected to the steering shaft 3 in the right-left direction can be reduced. As a result, a driving force of a motor of an electric power steering apparatus may be reduced in comparison with that of the conventional one and a motor 7 may be replaced with a smaller one, thereby resulting in reduction in weight of the vehicle and in reductions of fuel consumption and cost of the vehicle.

It is noted that in FIG. 1, the strut type suspension unit 30 has been explained as an example of a suspension unit for turning wheel. However, the present invention is not limited to this, and may be applied to a suspension unit such as a double wishbone type suspension unit and a multi link type suspension unit.

As described above, in the suspension unit 30 shown in FIG. 1, an axial tension is reduced by setting the Kp offset Loff large, thereby revolving the tire (front wheel 31L) around the kingpin axis Ak, instead of reducing a torsional force of the tire (front wheel 31L) by decreasing the Kp offset Loff. In other words, the axial tension is reduced by setting an intersection point of the extended line of the kingpin axis Ak with the tire contact surface G inside a tread surface T (see FIG. 1) of the tire.

It is noted that the tread surface T is a surface between the centers of the right and left tires.

However, due to the reduction of the axial tension, a self aligning torque (hereinafter, referred to as SAT) for maintaining a straight running stability of the vehicle is reduced and a steering reaction force becomes poor. As a result, there is a possibility that the straight running stability of the vehicle is decreased. In addition, due to the revolution of tires of turning wheels (front wheel 31L on left side and front wheel on the right side), a revolution moment of the tires of the turning wheels (front wheel 31L on left side and front wheel on the right side) becomes large. As a result, a stuck in tracks may be caused and disturbance toughness may be decreased.

Therefore, in the embodiment, a steering motor of existing electric steering apparatus is converted to an electric generator in the steering damper apparatus 1 to conduct a damper control, while the suspension unit 30 is used as it is. As a result, a trouble due to the reduction of the axial tension is overcome. Hereinafter, a steering damper apparatus 1 which is applied to the embodiment will be explained in detail.

<Steering Damper Apparatus 1>

Figure 2:
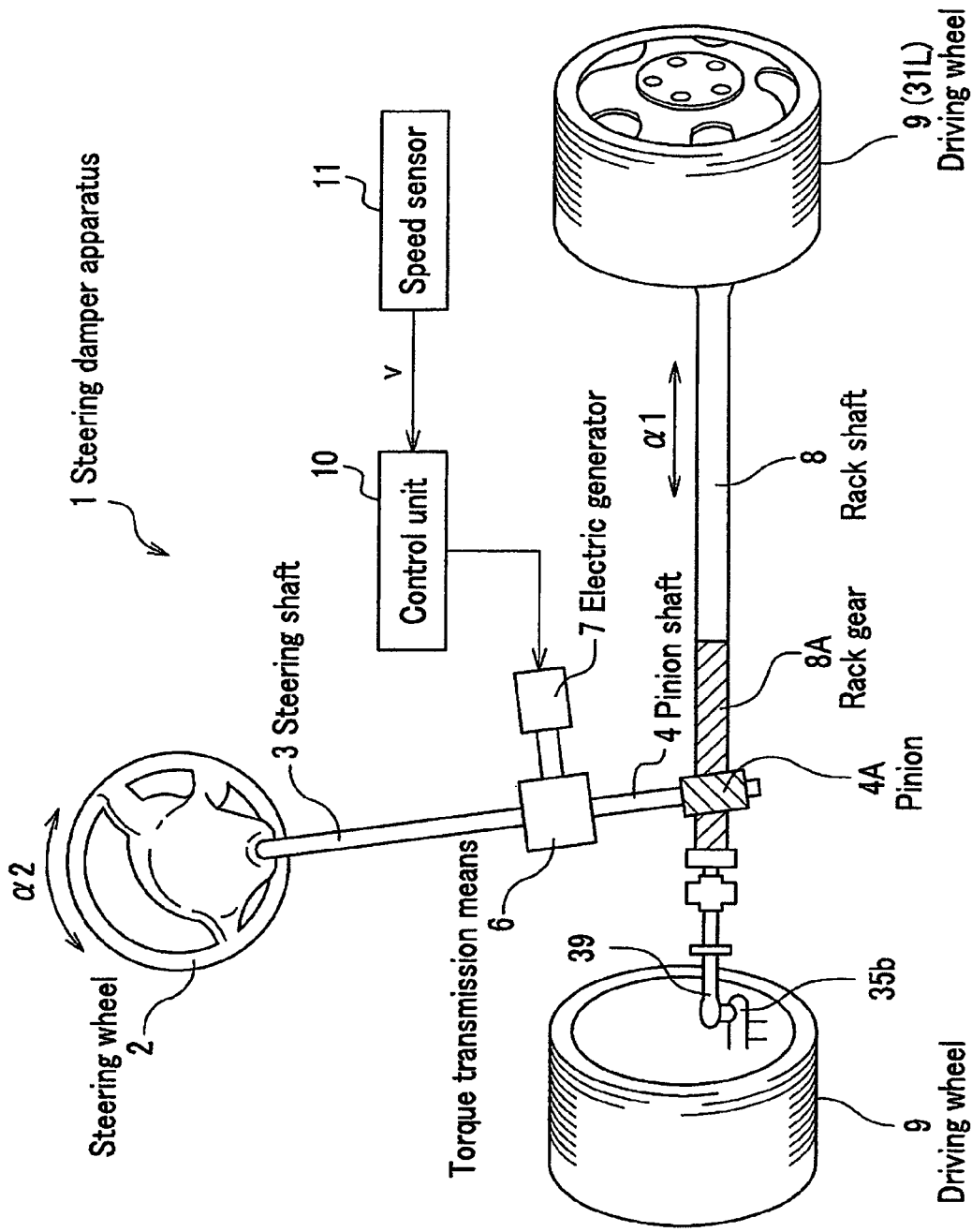
FIG. 2 is a whole configuration diagram of a steering damper apparatus according to the embodiment.

FIG. 2 is a whole configuration diagram of a steering damper apparatus 1 according to an embodiment of the present invention. The steering damper apparatus 1 is different from a common electric power steering apparatus, and not provided with a torque sensor for detecting a steering torque and a motor (steering motor) for adding an auxiliary torque to a steering system.

Therefore, a steering assist for reducing a manual steering force of the driver is not conducted. Namely, there is no steering motor in the steering damper apparatus 1 according to the embodiment, but exists an electric generator 7.

In more details, in the embodiment, since there is no steering motor, there is no need to supply electric power to the steering damper apparatus 1. Instead, by connecting/disconnecting both terminals of an armature coil of the electric generator 7 depending on a vehicle speed, if, for example, a steering operation is conducted when the both terminals are connected, the electric generator 7 generates electric power. Due to the generation of regenerative electric power by the electric generator 7, a regenerative braking force (braking force) is applied to the steering system to conduct a damper control. An apparent configuration of the steering damper apparatus 1 is the same with the existing electric power steering apparatus except for the above-mentioned feature. Accordingly, a manufacturing cost of the steering damper apparatus 1 can be reduced.

Namely, as shown in FIG. 2, the steering damper apparatus 1 includes a steering wheel 2 that a driver rotates in a direction of arrow α2 when the driver sets a traveling direction of the vehicle, and the steering wheel 2 is connected to a pinion shaft 4 which moves a rack shaft 8 in a direction of arrow α1 through a steering shaft 3.

A steering torque generated by a manual operation of the steering wheel 2 by the driver is transmitted to the pinion shaft 4 through the steering shaft 3. A torque transmission means 6 for transmitting the steering torque which operates on the steering system is fit on the pinion shaft 4, and connected to the electric generator 7 which adds a braking force to the steering system as appropriate. It is noted that a steering system connection member is a component such as the steering shaft 3, pinion shaft 4, and rack shaft 8, which transmit a steering force of the steering wheel 2 to a driving wheel 9 (front wheel 31L on the left side and front wheel on the right side).

The electric generator 7 has the same configuration with a steering motor which is used for a common electric power steering apparatus, and consists of, for example, a rotor made of permanent magnet and a stator that is an armature coil. Both terminals of the armature coil of the electric generator 7 are not connected to a power source such as a battery, but exposed outside without connection (being free). Namely, there is no power supply to the both terminals of the armature coil from a power source. In other words, when the both terminals are disconnected, the electric generator 7 does not generate electric power. On the other hand, when the both terminals are connected, the electric generator 7 generates regenerative electric power by rotation of the rotor made of permanent magnet.

In addition, as shown in FIG. 2, the steering damper apparatus 1 has a configuration of so-called "rack-and-pinion type". A pinion 4A disposed at the lower end of the pinion shaft 4 is engaged with a rack gear 8A formed on the rack shaft 8, and a rotation of the pinion shaft 4 is transformed into a displacement in a direction (direction of arrow α1) of the rack shaft 8 to turn driving wheels 9, 9 (front wheel 31L on the left side and front wheel on the right side) around the kingpin axis Ak.

A speed sensor 11 detects a vehicle speed and outputs a speed signal v to a control unit 10. The control unit 10 generates a PWM signal based on the speed signal v which is input from the speed sensor 11. Namely, the control unit 10 increases a PWM duty (ratio of ON time in one cycle of PWM waveform) as the vehicle speed becomes faster (as a value of speed signal v becomes higher) to prolong the ON time of the PWM waveform, while reducing the PWM duty to prolong an OFF time of the PWM waveform as the vehicle speed becomes slower (as a value of speed signal v becomes lower).

Furthermore, the control unit 10 controls the electric generator 7 to generate regenerative electric power by connecting the both terminals of the armature coil of the electric generator 7 during the ON time of the PWM waveform, and to stop generation of electric power of the electric generator 7 by opening the connection of the both terminals during the OFF time of the PWM waveform.

In addition, although not shown in detail, the torque transmission means 6 is configured to rotate the pinion shaft 4 through a worm gear (not shown) by a rotation torque of the steering wheel 2. As described above, the rotation torque of the steering wheel 2 is transmitted to the pinion shaft 4 through the torque transmission means 6, and further transmitted to the steering system from the rack shaft 8 through the pinion 4A and rack gear 8A to turn the driving wheel 9 (front wheel 31L on the left side and front wheel on the right side).

In addition, the torque transmission means 6 transmits a regenerative braking torque (braking torque due to generation of regenerative electric power) to the steering shaft 3 through, for example, a worm gear (not shown) connected to a rotation shaft of the electric generator 7 and a wheel gear (not shown) which is engaged with the worm gear and connected to the steering shaft 3, to conduct a damper control for a rotation force applied to the steering wheel 2.

Using the configuration described above, when a driver conducts a steering operation on the running direction by rotating (direction of arrow α2 in FIG. 2) the steering wheel 2 during the vehicle is running, a rotation force based on a steering torque applied to the steering shaft 3 is transformed into a linear movement in a direction of the rack shaft 8 through the pinion shaft 4A and rack gear 8A, and operates to change the running direction of the driving wheels 9, 9 (front wheel 31L on the left side and front wheel on the right side).

It is noted that in the embodiment, a case where a damper control is conducted by applying a braking force of the electric generator 7 to the steering shaft 3 has been shown as an example. However, the damper control may be conducted by applying the braking force of the electric generator 7 to the rack shaft 8 instead of the steering shaft 3. A configuration of the damper control may be selected as appropriate and not limited, as long as the damper control is conducted by applying the braking force of the electric generator 7 to a transmission mechanism of the steering force between the steering wheel 2 and the driving wheels 9, 9 (front wheel 31L on the left side and front wheel on the right side).

Next, in the steering damper apparatus 1 shown in FIG. 2, operations of damper control of a steering system by the electric generator 7 according to the embodiment of the present invention will be explained. For example, when a vehicle speed becomes fast, since a value of the speed signal v which is supplied to the control unit 10 from the speed sensor 11 becomes high, the control unit 10 prolongs the ON time of the PWM waveform by increasing the PWM duty, and connects the both terminals of the armature coil of the electric generator 7 during the ON time to generate regenerative electric power by the electric generator 7 under the condition that the electric generator 7 is rotated, for example, by the steering operation. According to the processes described above, the electric generator 7 operates to add a negative torque, that is, a resistive torque to the torque transmission means 6. As a result, a damper control is conducted, where a braking force is added to a rotation torque generated by a steering operation of the steering wheel 2.

Meanwhile, the regenerative electric power of the electric generator 7 is stored in a battery or consumed by a resistance and the like. When a rotation speed of the electric generator 7 is fast, an amount of electric power to be generated by the electric generator 7 becomes large in comparison with a case of slow rotation speed even if the vehicle speed is the same, thereby resulting in generation of a larger braking force in the steering system. In addition, when the vehicle speed is fast, an amount of electric power to be generated by the electric generator 7 becomes large in comparison with a case of slow vehicle speed even if the rotation speed of the electric generator 7 is the same, thereby resulting in generation of a larger braking force in the steering system.

As described above, the PWM duty becomes larger as a vehicle speed becomes faster, and a connection time of the armature coil becomes longer. Therefore, an amount of electric power generation (amount of regenerative electric power) of the electric generator 7 increases. As a result, a regenerative braking force (braking force) of the electric generator 7 is increased, and a relatively large braking force is applied to the rotation force generated by a steering operation of the steering wheel 2, accordingly.

If a steering operation is conducted fast at such a high vehicle speed, an amount of electric power generation further increases, thereby resulting in increase in the braking force on the steering operation. On the other hand, if the steering operation is conducted slow, an amount of the electric power generation decreases, thereby resulting in decrease in the braking force on the steering operation. As described above, when a vehicle is running at high speed, since a damper control is conducted so that a braking force is applied to a steering operation depending on a speed of the steering operation of the steering wheel 2, a stability of the steering operation of the steering wheel 2 by the driver increases.

In addition, as the vehicle speed becomes slower, the ON time of the PWM waveform becomes shorter, thereby a connection time of the armature coil becomes shorter and an amount of the electric power generation of the electric generator 7 decreases. As a result, a braking force by the electric generator 7 decreases, and a braking force of the steering wheel 2 becomes weak. Therefore, as a vehicle speed becomes slower, the steering force (axial tension) of the steering wheel 2 becomes small, and a light (easy) steering operation becomes possible in the steering operation at low speed, accordingly.

Furthermore, when the vehicle speed becomes extremely slow, the ON time of the PWM waveform which is output from the control unit 10 becomes zero. That is, since all the PWM waveforms which are output from the control unit 10 become the OFF time, the armature coil of the electric generator 7 is always disconnected (opened), thereby the entire regenerative electric power of the electric generator 7 becomes reactive power without consuming and a regenerative braking force is not generated in the electric generator 7, accordingly.

As a result, since a braking force of the electric generator 7 is not operated on a rotation of the steering wheel 2, the axial tension can be reduced at extremely low speed, and thereby a fast steering operation can be conducted. Consequently, the steering operation becomes easy even at extremely low speed.

It is noted that if both terminals of the armature coil of the electric generator 7 are being disconnected (opened), an extremely high voltage may be generated on the both terminals by generation of reactive power. Therefore, it is preferable that the both terminals of the armature coil are connected to a high resistance, or a device which absorbs a surge voltage and the like.

In addition, when a steering angle of the steering wheel 2 is at around a neutral position, the both terminals of armature coil of the electric generator 7 are being connected. Therefore, a wandering of the steering angle of the steering wheel 2 is suppressed in a straight running since a braking force of the electric generator 7 works as a resistance force against a rotation of the steering wheel 2, and a stability of the straight running can be maintained, accordingly.

<Damper Control of Steering System Using Steering Damper Apparatus 1>

Next, a flow of a damper control of a steering system using the steering damper apparatus 1 shown in FIG. 2 will be explained.

Figure 3:
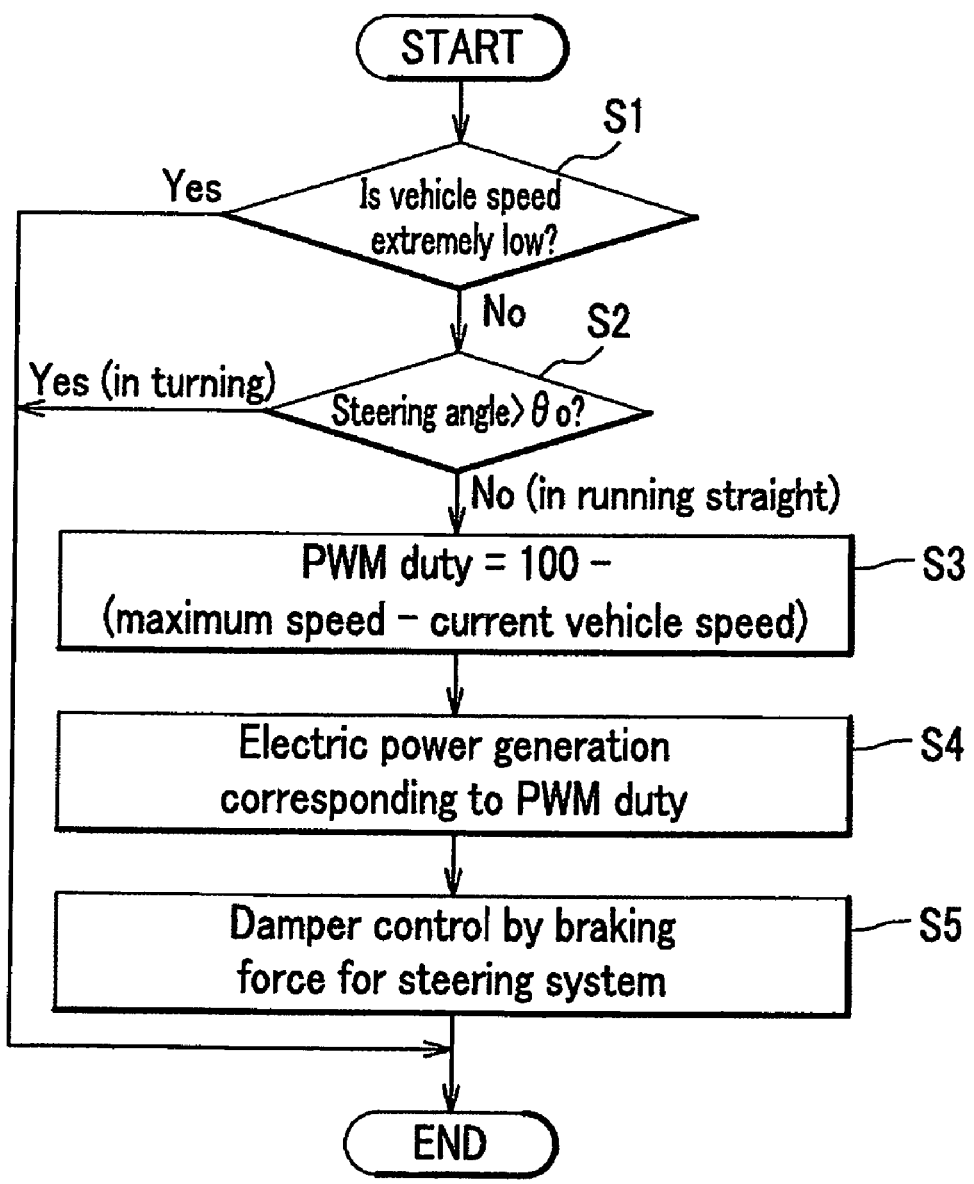
FIG. 3 is a flowchart showing a flow of a damper control of a steering system in a vehicle steering apparatus according to the present invention.

FIG. 3 is a flowchart showing a flow of a damper control using the steering system 1 in a vehicle steering apparatus according to the present invention.

As shown in FIG. 3, first, the control unit 10 determines whether or not the vehicle is running at extremely low speed (step S1).

If the vehicle is running at extremely low speed (step S1: Yes), the control unit 10 disconnects both terminals of armature coil of the electric generator 7 so that electric power of the electric generator 7 is not output, and ends processing of a damper control without operating a braking force on the steering system.

On the other hand, in step S1, if the vehicle is running at a speed other than extremely low speed (step S1: No), the control unit 10 determines whether or not a steering angle of the steering wheel 2, which is detected by a steering sensor (not shown), is larger than a predetermined angle θ0 (whether or not "steering angle>θ0") (step S2).

If the steering angle of the steering wheel 2 is larger than θ0 (steering angle>θ0) (step S2: Yes), the vehicle is in turning. Therefore, the control unit 10 disconnects the both terminals of armature coil of the electric generator 7 so that electric power of the electric generator 7 is not output, and ends the processing of the damper control without operating a braking force on the steering system.

On the other hand, if the steering angle is not larger than θ0 (steering angle≦θ0), that is, the steering angle of the steering wheel 2 is not more than θ0 (step S2: No), the vehicle is running substantially straight. Therefore, the control unit 10 calculates the PWM duty using the following formula, "PWM duty=100−(maximum speed−current vehicle speed)" (step S3). According to the PWM duty which is calculated based on the current vehicle speed, the control unit 10 connects the both terminals of armature coil of the electric generator 7 so that the electric generator 7 outputs electric power (regenerative electric power) (step S4).

Then, a braking force is operated on the steering system using the regenerative braking force which is generated by the electric power generation of the electric generator 7 to conduct a damper control (step S5). Meanwhile, step S5 describes effects to be obtained as a result of the control.

Processing of steps S3 to S5 in FIG. 3 will be explained specifically. For example, if the maximum speed is 100 km/h and the current vehicle speed is 50 km/h, the PWM duty becomes 50 (%) (PWM duty=50 (%)). Therefore, the control unit 10 connects the both terminals of armature coil of the electric generator 7 based on PWM duty=50 (%) so that the electric generator 7 generates electric power at 50 (%) of the full power. Then, a regenerative braking force (braking force) corresponding to 50% of the full power of the electric generator 7 is operated on the steering system to conduct a damper control, and as a result, an optimum steering feeling can be obtained for the vehicle speed of 50 km/h.

Namely, if the current vehicle speed varies in a range of 10 km/h to 90 km/h, an output power of the electric generator 7 varies corresponding to the PWM duty ranging from 10 to 90%, and a braking force corresponding to each output power of the electric generator 7 is operated on the steering system to conduct a damper control. As a result, an optimum steering feeling can be obtained at each vehicle speed ranging from 10 km/h to 90 km/h. In other words, when the vehicle is running at a speed between 0 km/h and 100 km/h, the control unit 10 controls the electric generator 7 to generate electric power (regenerative electric power) according to the PWM duty corresponding to the vehicle speed at the time, and a braking force corresponding to the output power of the electric generator 7 is operated on the steering system to conduct a rotation damper control of the steering wheel 2. As a result, an optimum steering feeling of the steering wheel 2 corresponding to each vehicle speed can be obtained.

In addition, when the vehicle is running at 100 km/h, the armature coil of the electric generator 7 is always connected (connected condition). Therefore, if a steering operation is conducted fast when the vehicle is running at 100 km/h, a large steering resistance works on the steering wheel 2, thereby a stable steering feeling can be obtained. On the other hand, when the vehicle is running at nearly to 0 km/h, the armature coil of the electric generator 7 is always disconnected (opened), thereby a regenerative braking force is not operated on the electric generator. As a result, a steering operation of the steering wheel 2 can be conducted with a relatively light (weak) steering force.

Furthermore, when the vehicle is running at nearly to 0 km/h, as shown in step S1 in FIG. 3, since the armature coil of the electric generator 7 is always disconnected (opened), a regenerative braking force is not operated on the electric generator 7 regardless of fast steering operation or slow steering operation. As a result, the steering operation can be conducted with a relatively light (weak) steering force.

It is noted that when the maximum speed is set at 100 km/h and if the current vehicle speed exceeds 100 km/h, all PWM duties are set to 100%. That is, the PWM duty is set to 100% regardless of whether the vehicle speed is 120 km/h or 180 km/h to generate maximum output power of the electric generator 7 and to operate maximum regenerative braking force (braking force) on the steering system. This enables the driver to conduct a stable steering operation at a speed higher than 100 km/h by a high steering rigidity to improve a stability of the vehicle. Meanwhile, the duty ratio in step S3 in FIG. 3 is calculated using a function. However, it may also be obtained using a map or table.

SUMMARY

As described above, in the vehicle steering apparatus according to the embodiment, a damper control of the steering damper apparatus 1 or electronic control steering damper is changed based on a vehicle speed and a steering angle of the steering wheel 2. With the damper control described above, an axial tension at extremely low vehicle speed can be reduced, as well as a straight running stability of the vehicle and an appropriate steering rigidity on rotating the steering wheel 2 are secured.

In addition, in such a case where a steering wheel (steering wheel 2) gets stuck by, for example, disturbances from the ground, a disturbance toughness is secured by changing a damper control based on a steering angle of the steering wheel 2 and a movement amount of the vehicle. Meanwhile, in the damper control for the disturbance toughness, a disturbance may be detected by disposing, for example, a torque sensor in the steering damper apparatus 1.

In addition, according a vehicle steering apparatus according to the embodiment, a straight running stability and a disturbance toughness, which are likely to be lost by the front wheel suspension geometry where the tire revolves in the suspension unit for turning wheel, which is introduced for reducing an axial tension, can be recovered by a damper control using the electric generator 7.

For example, a damping efficiency of the installed steering damper apparatus 1 or an electronic control steering damper in the suspension unit for turning wheel is increased by determining a straight running condition at a vehicle speed higher than a predetermined value, where a steering rigidity is required, by using a vehicle speed and a steering angle. As a result, an optimum steering feeling can be obtained at each vehicle speed.

Specifically, a steering motor is converted to an electric generator, and both terminals of an armature coil of the electric generator 7 are connected during the ON time of the PWM control to increase the electromagnetic damper effect. As a result, an optimum damper control for the steering system can be achieved. In this case, a steering speed required for a damper control of the conventional electric steering apparatus is unnecessary.

It is noted that in the embodiment, a suspension unit having the structure shown in FIG. 1 has been explained as an example to which the present invention is applied. However, the present invention may also be applied to a common suspension unit which has a light steering force. For example, the present invention may be applied to a vehicle which is light in weight, or whose tire has a narrow width (for example, light weight car).

In addition, in the damper control for the disturbance toughness described above, the disturbances may be detected using a torque sensor.

What is claimed is:

1. A vehicle steering apparatus, comprising:
   a steering system connection member connecting a steering wheel and a tire;
   an electric generator installed in the steering system connection member so as to adjusting a steering force of the steering wheel; and
   a control unit for controlling a connection/disconnection of both terminals of an armature coil in the electric generator based on a vehicle speed.

2. The vehicle steering apparatus according to claim 1, wherein when a steering angle is at around a neutral position, the both terminals of the armature coil are connected.

3. The vehicle steering apparatus according to claim 2, wherein an intersection point of an extended line of a kingpin axis of the tire with a tire contact surface is located inside a tread surface of the tire.

4. The vehicle steering apparatus according to claim 3, wherein the both terminals of the armature coil in the electric generator are connected through a battery.

5. The vehicle steering apparatus according to claim 2, wherein the both terminals of the armature coil in the electric generator are connected through a battery.

6. The vehicle steering apparatus according to claim 1, wherein an intersection point of an extended line of a kingpin axis of the tire with a tire contact surface is located inside a tread surface of the tire.

7. The vehicle steering apparatus according to claim 6, wherein the both terminals of the armature coil in the electric generator are connected through a battery.

8. The vehicle steering apparatus according to claim 1, wherein the both terminals of the armature coil in the electric generator are connected through a battery.

* * * * *